United States Patent
Kettlitz et al.

(10) Patent No.: US 6,235,894 B1
(45) Date of Patent: May 22, 2001

(54) STABILIZED HIGH VISCOSITY STARCHES

(75) Inventors: Bernd Wolfgang Kettlitz, Bonheiden; Jozef Victor Jean Marie Coppin, Denderleeuw, both of (BE)

(73) Assignee: Cerestar Holding B.V., La Sas Van Gent (NL)

( * ) Notice: Subject to any disclaimer, the term of this patent is extended or adjusted under 35 U.S.C. 154(b) by 0 days.

(21) Appl. No.: 08/868,584

(22) Filed: Jun. 4, 1997

(30) Foreign Application Priority Data

Jun. 4, 1996 (GB) .................................................. 9611595

(51) Int. Cl.$^7$ ........................... C08B 31/00; C08B 33/00; C08B 35/00; C07H 1/00
(52) U.S. Cl. ........................... 536/102; 536/105; 536/124
(58) Field of Search ................................... 536/102, 124, 536/105

(56) References Cited

U.S. PATENT DOCUMENTS

| | | | |
|---|---|---|---|
| 2,317,752 | 4/1943 | Fuller | 127/33 |
| 2,354,838 | 8/1944 | Schopmeyer et al. | 536/105 |
| 2,989,521 | 6/1961 | Hunt et al. | 536/106 |
| 3,839,320 | * 10/1974 | Bauer | 536/110 |
| 4,281,111 | 7/1981 | Hunt et al. | 536/111 |
| 4,789,557 | * 12/1988 | Friedman et al. | 426/578 |
| 4,872,951 | * 10/1989 | Maliczyszyn et al. | 162/135 |

FOREIGN PATENT DOCUMENTS

| | | |
|---|---|---|
| 47-24133 | * 7/1972 | (JP) . |
| 159476 | * 12/1992 | (WO) . |

OTHER PUBLICATIONS

Shimashita, M. "Chemically Modified Starches", *Denpun Kagaku*, vol. 38(1): 55–63, Abstract Only 1991.*

Database WPI Apr. 2, 1971 Derwent Publications Ltd., London, GB, vol. S. No. 7 p. 6, AN 12945S.

* cited by examiner

Primary Examiner—Howard C. Lee
Assistant Examiner—Everett White
(74) Attorney, Agent, or Firm—Kendrew H. Colton

(57) ABSTRACT

The present invention relates to heat stable high viscosity starches. The starches of the present invention are obtained by reacting high viscosity starch with activated chlorine under alkaline conditions. The starches of the present invention are used to replace viscosity stable starches obtained by conventional chemical cross-bonding.

20 Claims, 6 Drawing Sheets

STABILIZED HIGH VISCOSITY STARCHES

TECHNICAL FIELD

The present invention relates to heat stable high viscosity starches. The starches of the present invention are obtained by reacting high viscosity starch with activated chlorine under alkaline conditions. The starches of the present invention are used to replace viscosity stable starches obtained by conventional chemical cross-bonding.

BACKGROUND OF THE INVENTION

When native starch granules are dispersed in water and heated the granules hydrate and swell at a temperature of 60° C. The starch suspension shows a peak viscosity at temperatures between 65 and 95° C. The increased viscosity is a desirable characteristic in many food applications. The swollen granules are however very fragile and tend to disintegrate which leads to a decrease in viscosity. Shear or extreme pH conditions tend to speed up this disintegration process.

High viscosity starches are starches which show an important increase in viscosity characteristics upon heating. Starches with a high swelling power are those derived from waxy varieties and starches derived from tubers and roots (e.g. potato, tapioca). The swollen granules burst to a large extent during heating which leads again to a drastic viscosity breakdown.

In order to overcome the undesirable viscosity breakdown starches may be stabilized. The viscosity breakdown can be overcome by treating the starch granules with chemical reagents. These reagents introduce intermolecular bridges or cross-links between the starch molecules. Stabilized high viscosity starches show substantial swelling of the granules on heating without disintegration of the swollen granules on prolonged heating. The integrity of the highly swollen starch granules in the heat stage guarantees a stable paste viscosity.

Typically cross-bonding of starch is performed with reagents such as phosphorus oxychloride, sodium trimetaphosphate, adipic anhydride, epichlorohydrin etc. In order to obtain stabilization at the highest possible viscosity level very low amounts of cross-linking agent are applied. The characteristics of the final product are very much dependent on the reaction conditions which have been applied. Small deviations in the dosed amount and slight changes in reaction time give rise to modified starches with an unpredictable viscosity behavior.

Highly swollen (viscous) cooking stable starches are used in many different applications, for example in the preparation of soups, sauces, meat products, dressings, microwavable food and in the preparation of bakery creams and fillings. Convenience foods need to have a high viscosity and smooth texture after heating (to 80–100° C.). Stabilized high viscosity starches are particularly suitable for the mentioned applications.

The field of applications further includes instant thickening food preparations when these starches are used in a pregelatinized form obtained by e.g. by roll-drying.

Chemical modification of starches is a well-known process the process has been described in several patents. With respect to background of the present invention the following patents may be relevant.

JP-B-07106377 (Japan Maize Products, Derwent publication Apr. 2, 1971, page 6 AN 11 12945S) describes the oxidation of starch. This patent describes a strong oxidation as it is mentioned that the temperature of the start of the gelatinization descends. It can be concluded that the conditions are such that the starch is de-polymerized.

U.S. Pat. 1,937,543 describes a method of making starch. It is described that an undesirable excess of sulfur dioxide is removed by the addition of a determined amount of sodium hypochlorite sufficient to oxidize the sulfur dioxide. Only a slight excess of the hypochlorite is used as an excess of chlorine may detrimentally affect the taste of the finished product. Starch is thus reacted with a slight excess of hypochlorite in relation to the sulfur dioxide which is present in an amount of from 15 to 20 parts per million. The product is reported to become thicker boiling.

U.S. Pat. No. 2,108,862 describes a process of making halogenated thick boiling starches. The reaction is performed at acidic pH.

U.S. Pat. No. 2,317,752 describes a method of producing what the inventors call 'inhibited' starch i.e. starch differing from raw starch in that it yields upon cooking in aqueous media a 'short' smooth and stable paste. It is reported that it is known that the reaction of starch with hypochlorite gives thin-boiling starches. Inhibited starches according to this patent are obtained when hypochlorite is used in combination with a considerable amount of a reaction modifier.

U.S. Pat. No. 2,354,838 describes a method for thinning waxy maize starch by hypochlorite treatment. The products obtained according to this patent are low viscosity starches with excellent clarity, adhesive strength and no retrogradation tendency.

U.S. Pat. No. 2,989,521 describes a method of cross-linking and oxidizing starch. The starting material for the hypochlorite treatment is extremely highly cross-bonded starch obtained with epichlorohydrin and with no measurable viscosity. This starch is then treated with high amounts of hypochlorite in order to weaken the structure and increase the viscosity. The diglycerol ether bonds are not broken during the alkaline hypochlorite treatment. By this treatment a large number of carboxyl groups (3–9 mol/100 (AGU) are introduced. Due to these hydrophylic groups the starch can better swell in water and develops a high viscosity.

U.S. Pat. No. 4,281,111 describes a hypochlorite treatment of starch at pH of around 3 followed by a hydroxypropylation.

Extensive chemical cross-bonding of starches is not allowed when the products are to be used in food applications. There is therefore a need for starch products which have been treated under mild conditions and which nevertheless have acquired the characteristics of a heat stable high viscosity starch. Moreover such mildly treated starches are allowed as ingredients in food products.

SUMMARY OF THE INVENTION

The present invention discloses heat stable high viscosity starches obtained by reacting starch or chemically modified starches with activated chlorine under alkaline conditions. Preferably the starches or modified starches are high viscosity starches which may be selected from the group consisting of waxy, root and tuber starches, most preferred are waxy starches including waxy maize, waxy rice, waxy potato, waxy sorghum and waxy barley. As chemically modified starches alkenyl succinate esters are used. More preferably n-octenyl succinilated starches.

The stabilized high viscosity starches of the present invention are prepared by reacting the starch with hypochlorite under alkaline conditions. Alternatively other chlorine forming agents are used.

The present invention also discloses starches which have been treated with hypochlorite and n-alkenyl succinic anhydride (nASA), this treatment is preferably performed in the order first the anhydride then the hypochlorite. Specifically, the treatment is performed with n-octenyl succinic anhydride (nOSA).

The starch products of the present invention are used to replace the viscosity stable starches obtained by conventional cross-bonding.

Furthermore the invention discloses applications of these starches.

DETAIELD DESCRIPTION OF THE INVENTION

Figure 1:
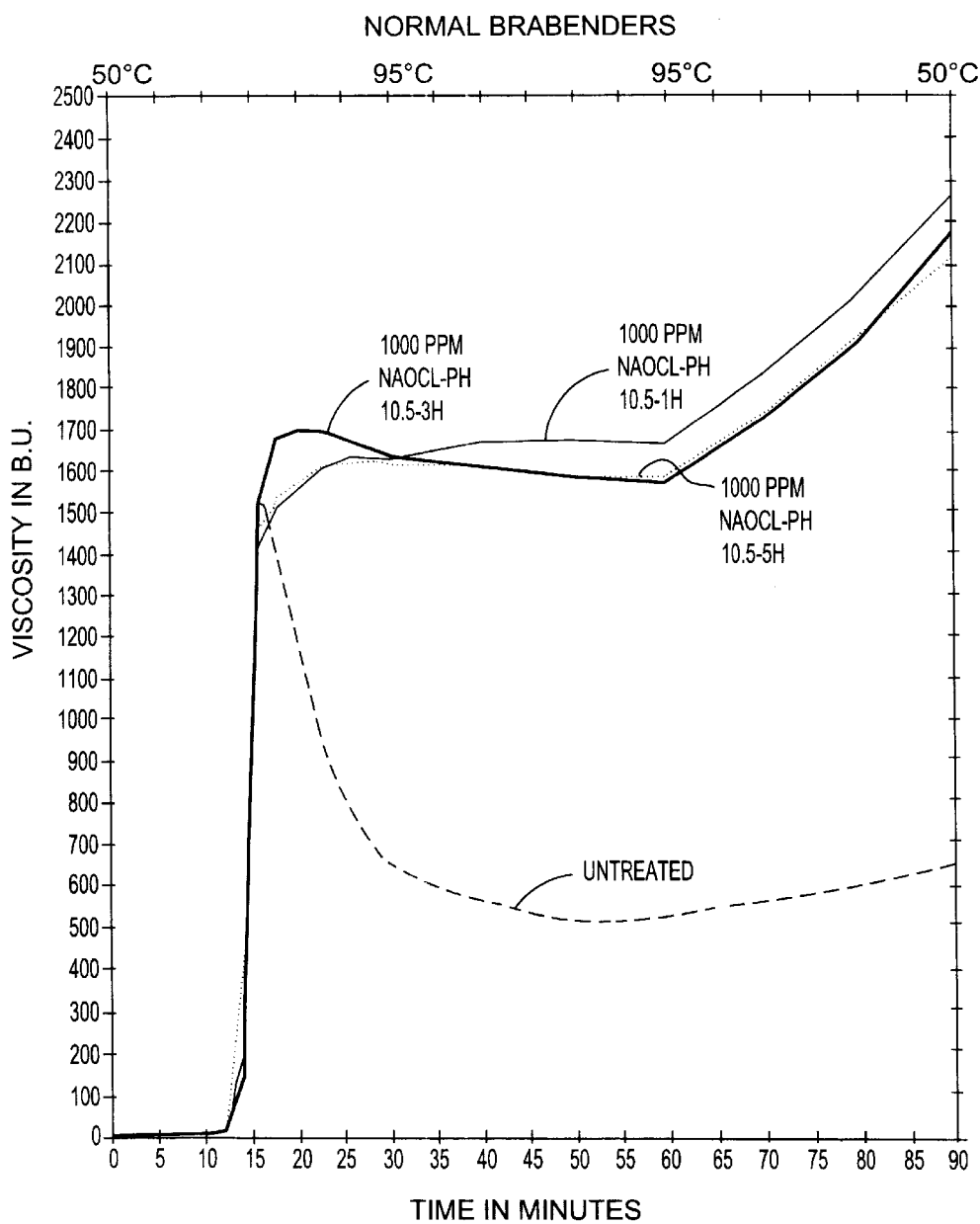
FIG. 1 Brabender viscograms of waxy maize starch (Cerestar 04201, 30 g/450 ml) treated with 1000 ppm active chlorine (added in the form of NAOCl) at pH 10.5 for 1, 3 and 5 hours.
Figure 1:
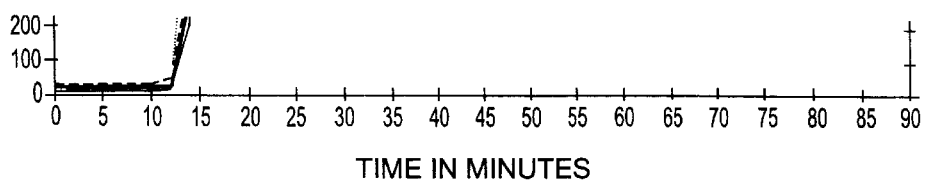

The present invention discloses a heat stable high viscosity starch prepared without the use of conventional cross-bonding reagents. All starches can be used to prepare the heat stable high viscosity starches according to the present invention. We prefer the use of starches selected from the group consisting of waxy, root and tuber starch. Most preferred are waxy starches including waxy maize, waxy rice, waxy potato, waxy sorghum and waxy barley.

The starches may be used as such or they may be chemically modified before or after the hypochlorite treatment.

The present invention is also illustrated by the treatment of double mutant starches dull waxy (duwx) and waxy shrunken–1 (wxshr–1) which showed the same favorable results. Moreover it could be shown that the treated double mutant starches showed an increased acid stability. This effect was most pronounced with the duwx starch.

Waxy starches and root or tuber starches normally suffer from a pronounced viscosity breakdown during prolonged heating. Therefore the stabilization effect due to the treatment of the present invention is most beneficial in these cases. Contrary to this group regular cereal starches (maize, wheat, sorghum) or leguminous starches (smooth pea, faba bean) and high amylose starches show no viscosity breakdown when heated at neutral pH under atmospheric conditions. Nevertheless these starches are further stabilized by the treatment of the present invention.

The products of the present invention are starches which due to the mild treatment with active chlorine have been modified in such a way that they retain a high viscosity even upon prolonged heating. The products of the present invention also retain high viscosity when heated under alkaline or acidic conditions. Furthermore the high viscosity is also retained after repeated heating and cooling.

The starches of the present invention show only a slight decrease of viscosity during the measurement with the Brabender viscograph, preferably the drop in viscosity is less than 20% more preferably less than 10% during heating at 95° C.

Of particular interest is the finding that the same effect is found when the starch is succinylated. In this case the starch is treated with n-alkenyl succinic anhydride (n-ASA), preferably with n-octenyl succinic anhydride (nOSA).

Moreover it was found that if the treatment with hypochlorite was performed after the treatment with NOSA the product differed from the product obtained by performing the reactions in the other order.

The starch products of the present invention are obtained by reaction with hypochlorite, preferably in the form of the sodium or calcium salt, corresponding to 100–4000 ppm active chlorine, preferably 500–2000 ppm, at a pH which is between 7.5 and 11.5 preferably between 8.5 and 10.5.

In general the reaction conditions (chlorine level, time, temperature, pH) have to be controlled in such a way that no starch degradation and no substantial formation of carboxyl groups (<0.1%) occur.

Typical reaction times and temperatures are between 0.25 to 5 hours and between 10 and 55° C. respectively.

The reaction is preferably carried out on native starches, however the combination with chemical substitutions such as acetylation, hydroxypropylation or n-octenylsuccinylation is not excluded. When the reaction is carried out in combination with a chemical modification such as acetylation, hydroxypropylation or n-octenylsuccinyladon, the treatment with chlorine can occur before, during or after the chemical modification reaction. The treatment during or after the chemical modification is preferred because of a more pronounced stabilization effect with the same treatment level of chlorine (Example 5).

Despite the fact that the intention is to replace the sometimes difficult to control chemical cross-bonding reaction (e.g. by phosphorus oxychloride, sodium trimetaphosphate or adipic anhydride) by alkaline chlorine treatment, a combination with this kind of modification can be beneficial too for further enhanced viscosity stabilization.

The hypochlorite of the present process can be replaced with a combination of reactants which are capable of forming active chlorine in situ, e.g. peracetic acid and/or hydrogen peroxide in the presence of excess chloride ions.

A further advantage of the process of the present invention that is the hypochlorite reaction performed under alkaline conditions is that a number of the other possible cross-bonding reaction are also normally performed under alkaline conditions so that the reactions can be performed simultaneously or consecutively without the need for changing the pH between the steps. Thus a one-pot process becomes possible. Such other modification reactions include hydroxypropylation and acetylation.

The heat stable high viscosity starches of the present invention are used in any application where thick boiling starches are used. Important applications include thickeners for soups and sauces, stabilizers for meat products, in dressings, spreads, convenience food.

Due to the high water binding capacity the products of this invention improve the freshness of bakery products. Pregelled products (instant starches) are especially suited for the stabilization of bakery products including fillings and creams.

In addition it is possible to replace only part of the classically cross linked starch with the starches of the present invention.

An additional advantage of the process of the present invention is the bleaching effect of the reaction which leads to a colorless product. In addition micro-organisms are eliminated leading to a more or less sterile product.

The present invention is illustrated by the reaction of waxy maize starch with sodium hypochlorite (Example 1). Waxy maize starch is reacted with 1000 ppm active chlorine added in the form of sodium hypochlorite. The reaction is continued for 1, 3 and 5 hours, respectively. The reaction time does not have a significant influence on the heat viscosity stability as measured by Brabender viscosymeter experiments.

In Example 2 it is demonstrated that the viscosity stabilization effect is pH dependent and that the effect increases with increasing pH.

In Example 3 other starches than waxy maize starch were treated according to the principle described in Example 1. Treatment was at pH 9.5 for 1 hour for waxy barley starch and potato starch and at pH 8.5 for tapioca starch. The viscosity data show clearly that the hypochlorite treatment under alkaline conditions of other waxy starches and of tuber and root starches leads to a similar viscosity improvement as shown for waxy maize starch.

Figure 3:
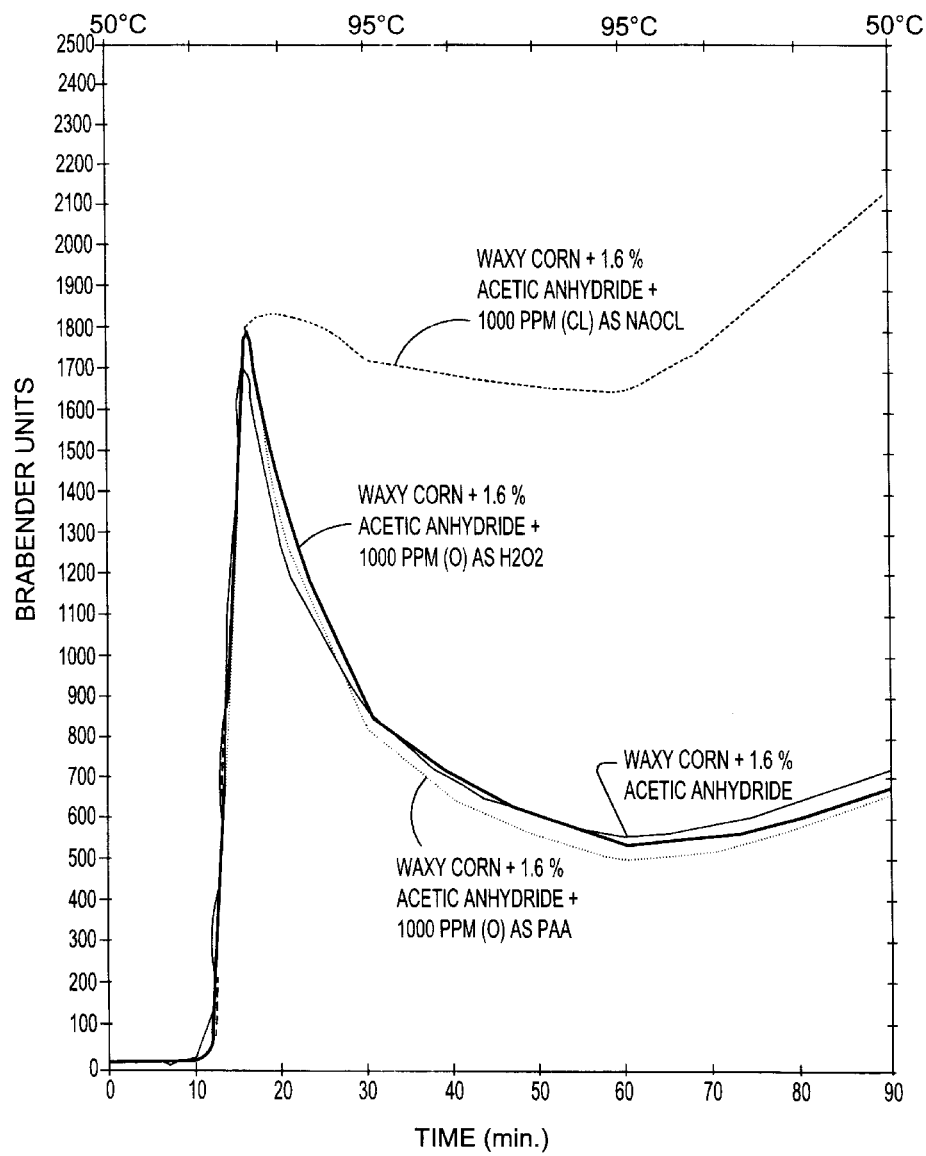
FIG. 3 Brabender viscograms of waxy maize starch (Cerestar 04201, 30 g/450 ml) treated with 1.6% acetic anhydride and 1000 ppm hydrogen peroxide, 1000 ppm peracetic acid or 1000 ppm sodium hypochlorite.
Figure 3:
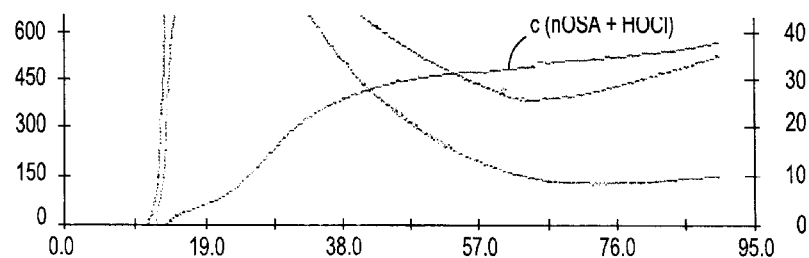

In Example 4 it is demonstrated that the effect is not observed when acetylated waxy maize starch is treated with hydrogen peroxide or peracetic acid. FIG. 3 demonstrates the surprising viscosity improving effect of hypochlorite in comparison with hydrogen peroxide or peracetic acid treatment for acetylated waxy maize starch. This example further serves to demonstrate that the effect is also observed when starting from chemically modified starch.

Figure 5:
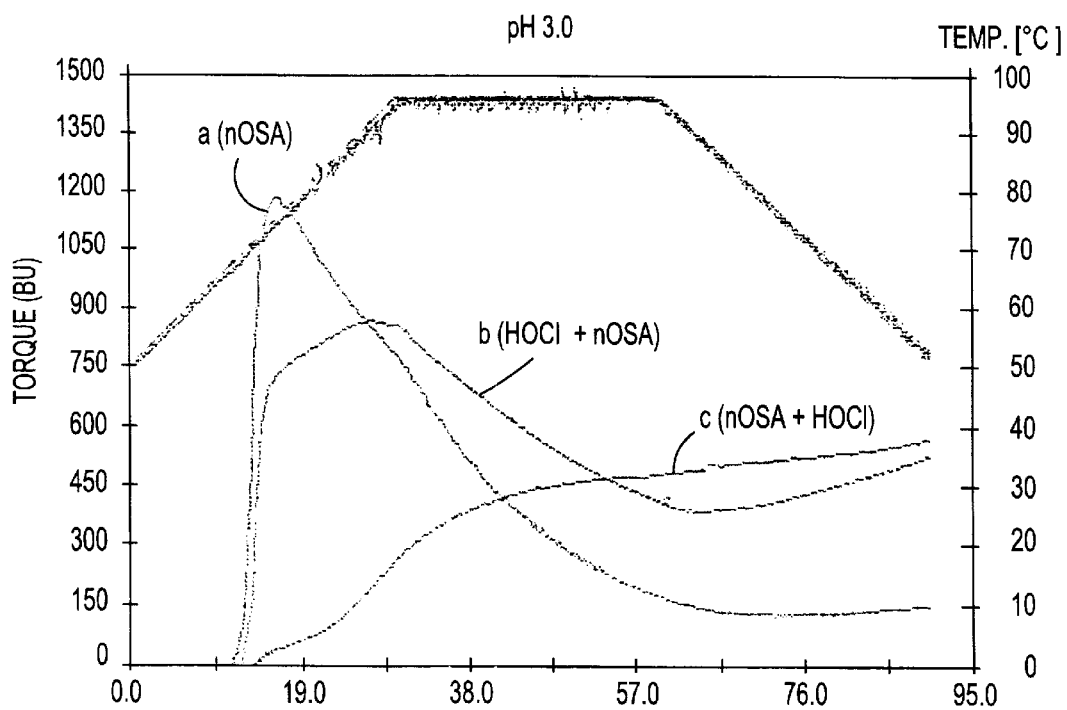
FIG. 5 Brabender viscograms of waxy maize starch (Cerestar 04201, 30 g/450 ml) treated with 3% n-octenyl succinic anhydride and 2000 ppm active chlorine (as sodium hypochlorite) (Brabender viscogram at pH 3.0)

Example 5 shows that an even higher stabilization effect is obtained in combination with n-octenyl succinylation. This example further demonstrates, that the sequence n-octenyisuccinylation-hypochlorite treatment leads to a better stabilization effect than the opposite sequence. A particular advantage of the combination n-octenyl succinylation-hypochlorite treatment is the high acid stability of this modified starch (FIG. 5).

Figure 6:
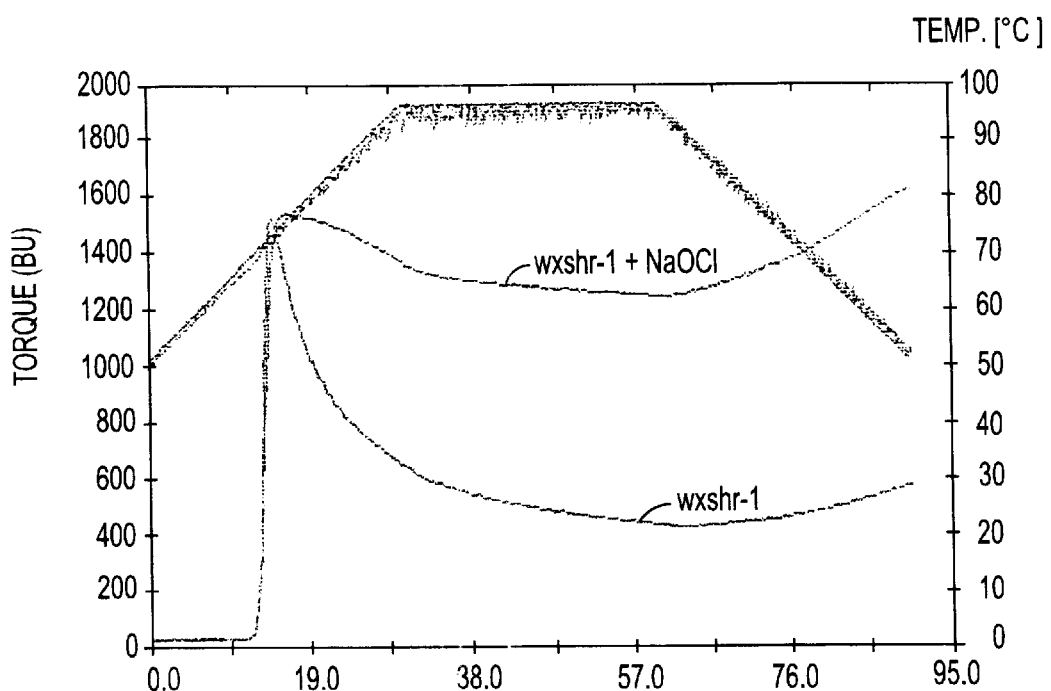
FIG. 6 Brabender viscograms of waxy shrunken –1 (wxshr–1) starch treated with 2000 ppm active chlorine (added in the form of NAOCl) for 1 hour at pH 9.5.
Figure 7:
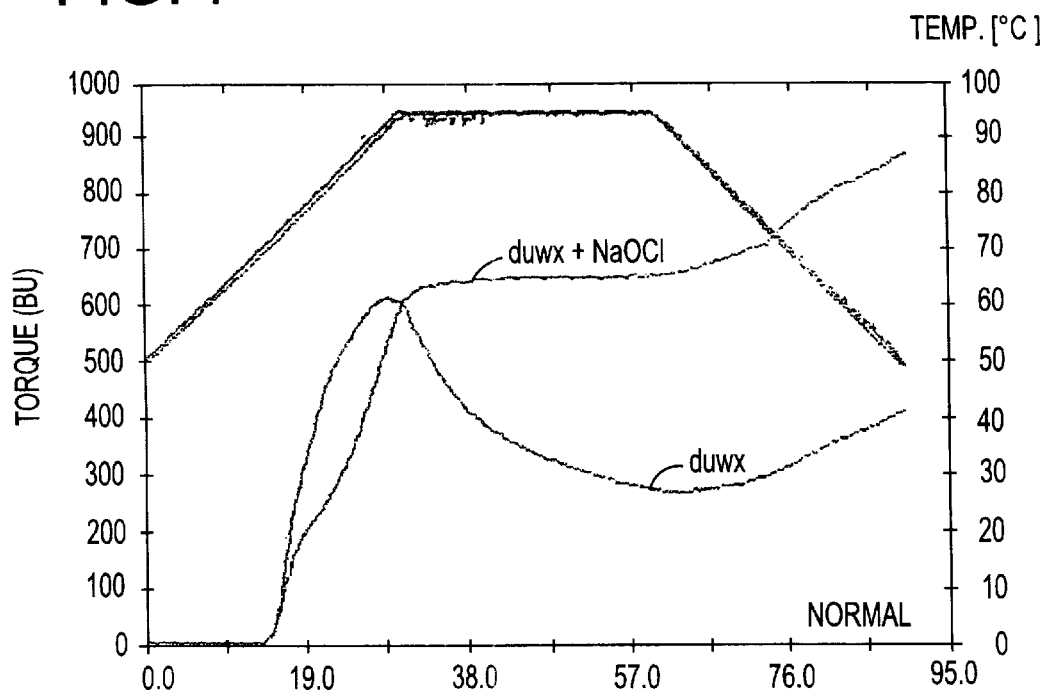
FIG. 7 Brabender viscograms of dull waxy (duwx) starch treated with 2000 ppm active chlorine (added in the form of NAOCl) for 1 hour at pH 9.5. (Brabender viscogram at pH 5.5.)

In Example 6 it is shown that double mutant maize starches can also be used with the same favorable results. Typically dull waxy (duwx) and waxy shrunken–1 (wxshr–1) maize starches have been used. The hypochlorite treated products show a considerably increased hot viscosity. (FIGS. 6 and 7).

Figure 8:
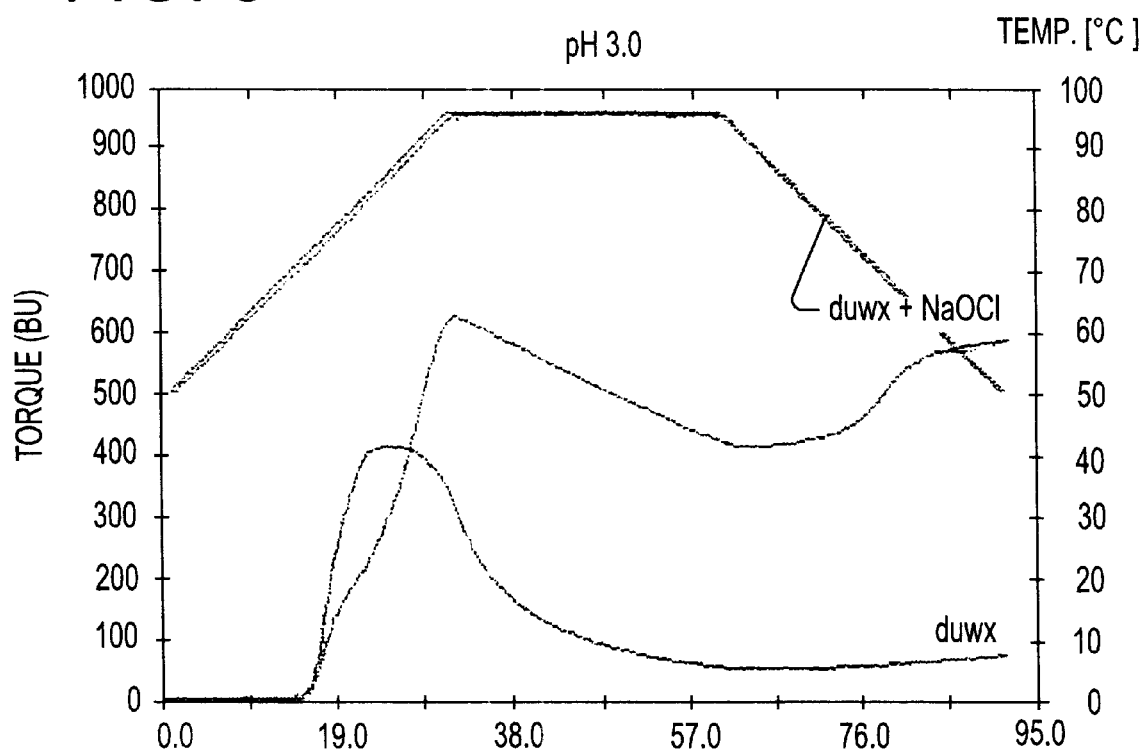
FIG. 8 Brabender viscograms of dull waxy (duwx) starch treated with 2000 ppm active chlorine (added in the form of NAOCl) for 1 hour at pH 9.5. (Brabender viscogram at pH 3.0.)

It is further shown that treated double mutant starches (in this case waxy starches) show a considerably increased acid stability when compared with untreated double mutant starch. This effect is most pronounced with duwx maize starch. (FIG. 8).

Experimental

The Brabender viscograms have been measured at pH 5.5 except for the duwx double mutant starch which has also been measured at pH 3.0 (Example 6).

Example 1

2 kg of native waxy maize starch (Cerestar 04201) are slurried in 3 l of tap water. The suspension is heated to 30° C. and the pH is adjusted at 10,5. To this slurry sodium hypochlorite is added in an amount corresponding to 1000 ppm of active chlorine. Under steady stirring the reaction is allowed to proceed for 1, 3, and 5 hours. After these time intervals samples are taken, the pH is brought to about 6 and excess chlorine is neutralized with sodium bisulphite. Subsequently the slurry is washed 2 times with the double volume of water and the resulting filter cake is dried in a fluid bed dryer (Fa. Retsch) at 60° C. to 10–15% moisture alternatively the cake is allowed to dry at ambient temperature overnight on the bench. From these starches Brabender viscograms are taken at a concentration of 30 g starch/450 ml water (see FIG. 1). Contrary to untreated waxy maize starch the products prepared according to this method show high and stable heat viscosity and a cold viscosity (50° C.) which is more than 3 times higher than that of the base material (expressed in Brabender units BU). The treatment time has only a marginal influence on the viscosity profile. The pastes can be stored overnight at ambient or refrigerator temperature without showing any gelling tendency.

Example 2

This example demonstrates, that the viscosity stabilization effect is pH dependent and that the effect increases with increasing pH.

Figure 2:
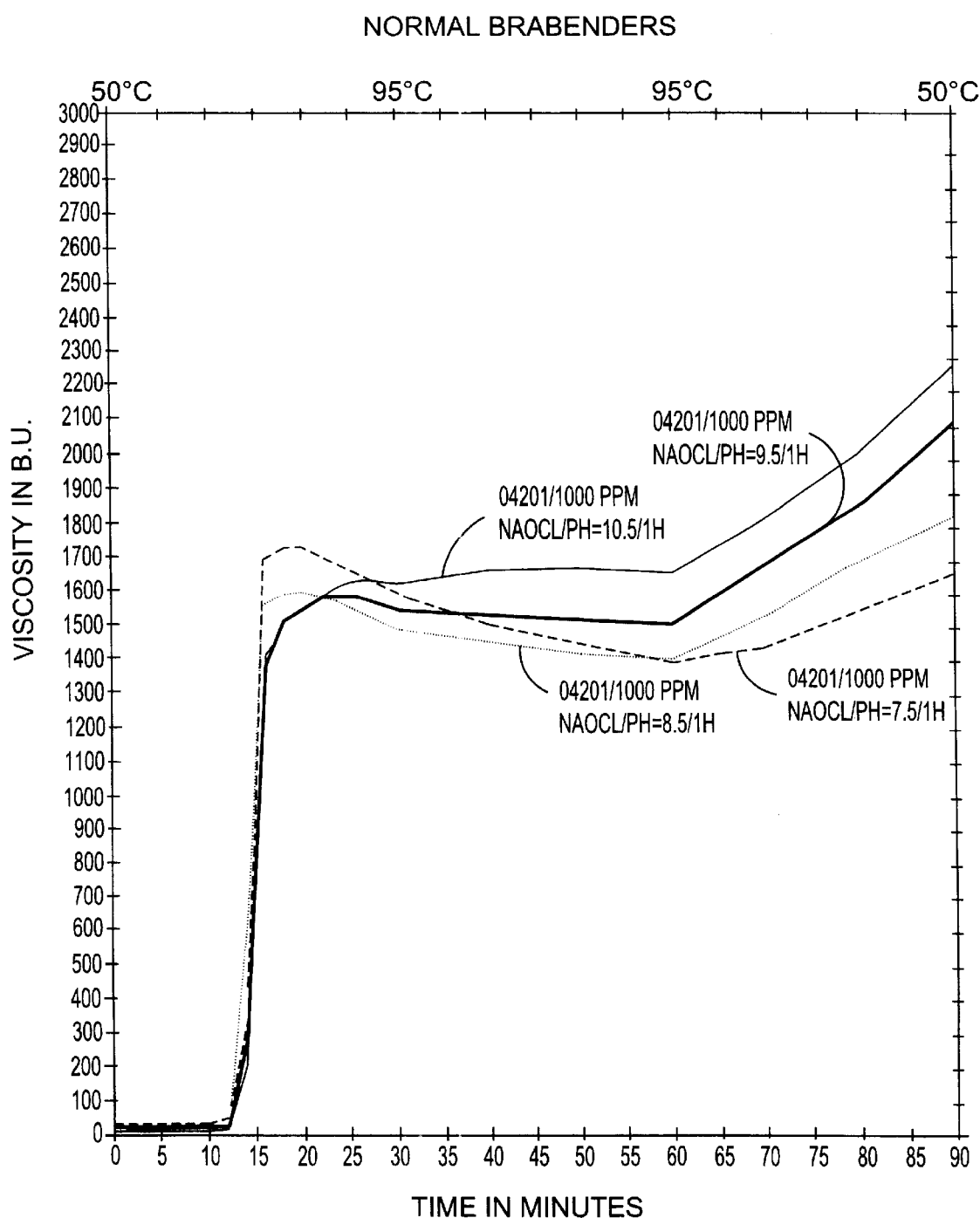
FIG. 2 Brabender viscograms of waxy maize starch (Cerestar 04201, 30 g/450 ml) treated with 1000 ppm active chlorine (added in the form of NAOCl) for 1 hour at pH 7.5, 8.5, 9.5 and 10.5.

The reactions on waxy maize starch were performed as described in Example 1, except the reaction time was fixed at 1 hour and the reaction pH was varied between 7.5 and 10.5. The Brabender curves of FIG. 2 demonstrate that the highest stabilization effect is obtained at pH 10.5 and that at pH 7.5 the viscosity at 95° C. is still slightly breaking down. Consequently the set-back viscosity becomes higher with increasing pH too.

Example 3

In this example other starches than waxy maize starch were treated according to the principle described in Example 1. Reactions were performed at pH 9.5 for 1 hour for waxy barley starch and potato starch and at pH 8.5 for tapioca starch. The attached table shows a comparison of the viscosity after 30 min at 95° C. (BU –95/30') which is a measure for the heat stability and after cooling to 50° C. (BU-50) of the hypochlorite treated starch in comparison with the corresponding base material.

| Starch | untreated | NaOCl-treated | BU-95/30' | BU-50 |
|---|---|---|---|---|
| Waxy barley | + | | 450 | 680 |
| | | + | 850 | 1320 |
| Tapioca | + | | 420 | 800 |
| | | + | 880 | 1670 |
| Potato* | + | | 430 | 660 |
| | | + | 1010 | 1720 |

*Different from the other starches (30 g/450 ml water) the viscograms for potato starch were made with 15 g starch/450 ml water The viscosity data show clearly that the hypochlorite treatment under alkaline conditions of other waxy starches and of tuber and root starches leads to a similar viscosity improvement as shown for waxy maize starch.

Example 4

2 kg of waxy maize starch are slurried in 4 l water, The pH is brought to 8.5 with 1N NAOH. Then sodium hypochlorite was added corresponding to 1000 ppm active chlorine. At 30° C. 32 g acetic anhydride were added drop wise within 15 min. whilst the pH was maintained at 8.0–8.5 by parallel addition of 1N NAOH. After all acetic anhydride was added the slurry was kept 15 min at pH 8.5 before the pH and the residual chlorine were neutralized as described in Example 1. After 2 times washing the starch was dried in a fluid-bed dryer and used in this form for the Brabender characterization.

For comparison the same reaction was carried out in the presence of hydrogen peroxide and peracetic acid respectively (1000 ppm active oxygen).

FIG. 3 demonstrates the surprising viscosity improving effect of hypochlorite in comparison with hydrogen peroxide or peracetic acid treatment for acetylated waxy maize starch too.

Example 5

This example demonstrates the special benefit of the combination of n-octeny) succinylation with hypochlorite treatment. It also shows that the reaction sequence is of importance for the stabilization effect. Curve a shows the profile of n-octenylsuccinyl starch obtained by a 1 hour treatment of waxy maize starch with 3% n-octenyl succinic anhydride at 30° C. and pH 8.5, Curve b shows the profile which is obtained after a 1 hour treatment with 2000 ppm active chlorine at 30° C. followed by n-octenyl succinylation as described for a. Curve c is obtained from a starch that is treated in the opposite sequence as described for b.

Figure 4:
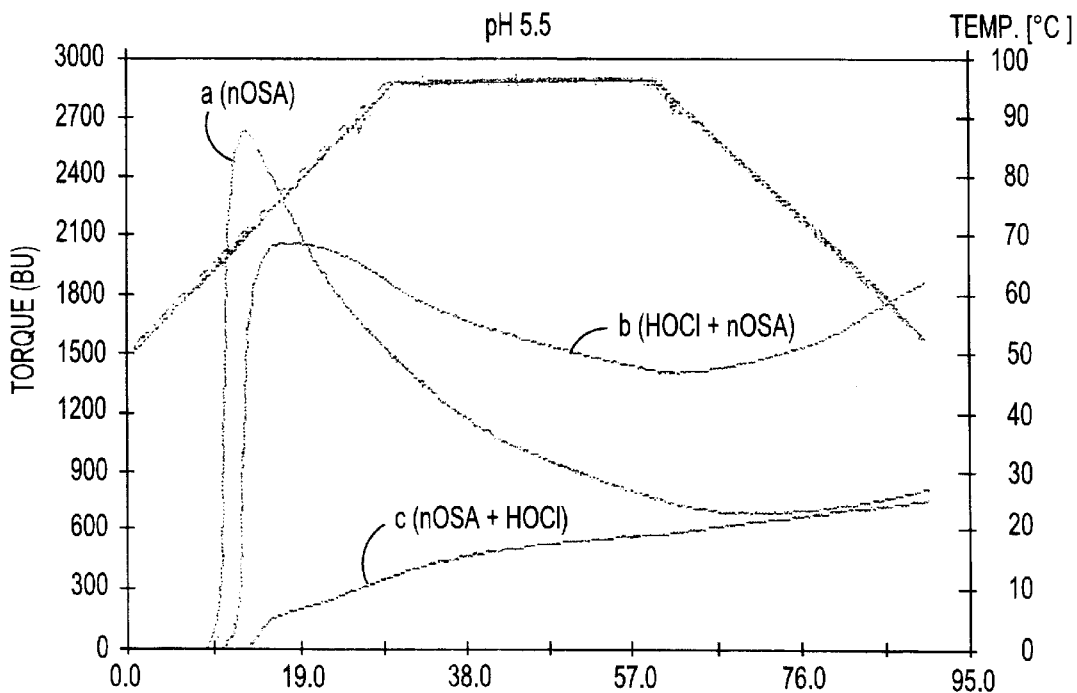
FIG. 4 Brabender viscograms of waxy maize starch (Cerestar 04201, 30 g/450 ml) treated with 3% n-octenyl succinic anhydride and 2000 ppm active chlorine (as sodium hypochlorite) (Brabender viscogram at pH 5.5)

At pH 5.5 (FIG. 4) as well as at pH 3 (FIG. 5) it can be seen that the treatment with hypochlorite increases the stability of n-octenylsuccinyl starch but the treatment with chlorine following n-octenyl succinylation gives the by far highest stabilization effect. Even under acidic condition there is no viscosity breakdown during prolonged heating in this case.

Example 6

This example demonstrates the special benefit of the alkaline hypochlorite treatment for the viscosity stabilization of starches derived from double mutant maize a) dull waxy (duwx) and b) waxy shrunken-1 (wxshr-1).

The reactions were performed as described in example with 2000 ppm chlorine at pH 9.5 for 1 hour.

Contrary to the parent starches the hypochlorite treated starches show a remarkable high and stable hot viscosity and a corresponding set-back viscosity which is 2–3 times higher than from the-native starches. This is demonstrated in FIGS. 6 and 7.

For the duwx maize starch it is further shown that the viscosity of the hypochlorite treated starch is more stable against acid (pH 3) than untreated starch (FIG. 8). While the viscosity of the native duwx starch is almost completely broken down after 30 min. at 95° C. The treated starch develops a high viscosity which only slightly decreases under these conditions.

What is claimed is:

1. A stabilized viscous starch obtained by
   esterifying a starch selected from the group consisting of waxy starches, root starches and tuber starches with an alkenyl anhydride, and subsequently
   bleaching the esterfied starch with a hypochlorite or a combination of reactants which yields 100–4000 ppm active chlorine in situ under alkaline conditions.

2. The stabilized viscous starch of claim 1, wherein said alkenyl anhydride is an alkenyl succinate.

3. The stabilized viscous starch of claim 2, wherein the alkenyl succinate is n-octenyl succinate.

4. A food composition containing a stabilized viscous starch obtained according to claim 1.

5. A process for preparing a heat stable viscous starch comprising:
   bleaching a chemically modified starch with hypochlorite under alkaline conditions, wherein said chemically modified starch is obtained by esterifying a starch with an alkenyl anhydride, wherein said starch is selected from the group consisting of waxy starches, root starches, tuber starches and double mutant starches, and wherein said hypochlorite is in the form of the sodium or calcium salt, corresponding to 100–4000 ppm active chlorine and at a pH which is between 7.5 and 11.5.

6. The stabilized viscous of claim 1 or starch 5, wherein the starch to be esterfied is a double mutant starch.

7. The stabilized viscous starch of claim 6 wherein the double mutant starch is a duwx type or wxshr-1 type.

8. A starch product obtained by a process comprising:
   esterifying a starch with n-octenylsuccinic anhydride; and
   subsequently treating said starch with hypochlotite or another active chlorine forming compound under alkaline conditions effective for bleaching said starch.

9. A process for preparing heat-stable viscous starch comprising:
   bleaching a chemically modified starch with hypochlorite under alkaline conditions, wherein said chemically modified starch is obtained by esterifying a starch selected from the group consisting of waxy starches, root starches, tuber starches and double mutant starches with an alkenyl anhydride.

10. The process of claim 9, wherein the reaction is performed using between 100 and 4000 ppm of hypochlorite at a pH between 7.5 and 11.5.

11. The process according to claim 9, wherein the alkaline conditions are represented by a pH of 7.5 to 11.5.

12. The process according to claim 11, wherein the pH is 8.5 to 10.5.

13. The process according to claim 9, wherein said bleaching is conducted such that substantially no carboxyl groups are formed.

14. The process according to claim 9, wherein said bleaching is conducted under conditions whereby the starch is not degraded.

15. The process according to claim 9, wherein said bleaching is conducted at a temperature between 10° C. and 55° C. for a period of time between 0.25 hour to 5 hours.

16. A stabilized viscous starch that substantially maintains its viscosity upon heating for 30 minutes at 95° C., wherein said stabilized viscous starch is obtained by reacting a modified starch selected from the group consisting of chemically modified waxy starches, chemically modified root starches and chemically modified tuber starches, said chemically modified starch being the product obtained by esterifying a waxy starch, root starch, or tuber starch with an alkenyl anhydride, with a hypochlorite or a combination of reactants which yields 500–2000 ppm active chlorine in situ under alkaline conditions.

17. The process according to claim 16, wherein the said combination of reactants comprises at least one of peracetic acid or hydrogen peroxide in the presence of excess chloride ions.

18. The process according to claim 16, wherein the starch which is to be esterfied is selected from the group consisting of waxy maize, waxy rice, waxy potato, waxy sorghum, and waxy barley.

19. A stabilized viscous starch according to claim 16, wherein said ester is obtained by succinylating a starch.

20. A stabilized viscous starch according to claim 19, wherein, in said succinylating an n-alkenyl succinic anhydride is used.

* * * * *